United States Patent
Matsushite et al.

(10) Patent No.: US 6,909,209 B2
(45) Date of Patent: Jun. 21, 2005

(54) LOW-PROFILE STEPPING MOTOR HAVING COILS WOUND RECTANGULARLY

(75) Inventors: Kunitake Matsushite, Shizuoka-ken (JP); Hiroshi Sano, Shizuoka-ken (JP); Toshihiko Nagata, Shizuoka-ken (JP)

(73) Assignee: Minebea Co., Ltd. (JP)

(*) Notice: Subject to any disclaimer, the term of this patent is extended or adjusted under 35 U.S.C. 154(b) by 0 days.

(21) Appl. No.: 10/825,274

(22) Filed: Apr. 15, 2004

(65) Prior Publication Data

US 2004/0217660 A1 Nov. 4, 2004

(30) Foreign Application Priority Data

Apr. 24, 2003 (JP) ........................................ 2003-119795

(51) Int. Cl.$^7$ ............................................. H02K 37/00
(52) U.S. Cl. ................................... 310/49 R; 310/91
(58) Field of Search ...................... 310/49 R, 89–91, 310/194, 257–259

(56) References Cited

U.S. PATENT DOCUMENTS 5,703,419 A * 12/1997 Mizutani .................. 310/49 R
5,708,406 A * 1/1998 Tsunoda et al. ............ 335/272
6,023,118 A * 2/2000 Gutris ......................... 310/172

FOREIGN PATENT DOCUMENTS

| JP | 08-182298 | 7/1996 |
| JP | 10-094237 | 4/1998 |
| WO | WO 00/72429 A1 | 11/2000 |

* cited by examiner

Primary Examiner—Thanh Lam
(74) Attorney, Agent, or Firm—Wallenstein Wagner & Rockey, Ltd.

(57) ABSTRACT

A stepping motor comprises a rotor assembly and a stator assembly. The stator assembly includes first and second stator units arranged horizontally on a same plane. Each stator unit is composed of: upper and lower stator yokes, which are shaped substantially semi-annular, arranged squarely opposite to each other in parallel, each have a plurality of pole teeth formed along its inner circumference so as to surround the rotor assembly, and which are coupled to each other with their respective pole teeth opposing each other so as to intermesh; a coil for exciting, wound rectangularly, and having its axis located outside the rotor assembly so as to be sandwiched between the upper and lower stator yokes; and a spacer shaped substantially in rectangular parallelepiped, oriented parallel to the axial direction of the rotor assembly, and inserted through the coil.

6 Claims, 5 Drawing Sheets

LOW-PROFILE STEPPING MOTOR HAVING COILS WOUND RECTANGULARLY

This application claims priority from Japanese Application Serial No. 2003-119795 filed on Apr. 24, 2003, which is incorporated herein reference.

BACKGROUND OF THE INVENTION

1. Field of the Invention

The present invention relates to a stepping motor, and more specifically to a stepping motor with its axial dimension reduced.

2. Description of the Related Art

Recently, stepping motors, which function to readily perform positional or angular control according to digital signals, are used widely in various equipments, such as a printer, a facsimile machine, a floppy disk drive (registered trademark), and the like.

For example, Japanese Patent Application Laid-Open No. H08-182298 discloses a claw-pole type PM (permanent magnet) stepping motor, usually called simply as PM stepping motor, which comprises a rotor assembly composed of a ring magnet circumferentially magnetized, and a stator assembly composed of two stator units axially stacked (refer to FIG. 1 therein). Since the PM stepping motor (hereinafter referred to simply as stepping motor) has two stator units stacked axially, reduction in its axial dimension is inhibited. In order to overcome the problem, Japanese Patent Application Laid-Open No. H10-94237 and PCT International Application (Japanese Translation) No. 2003-500998 disclose stepping motors structured to have a stator assembly composed of two segments (stator units) which are shaped semi-annular and which are arranged horizontally on a same plane so as to be symmetric about a rotary shaft of a rotor. The semi-annular stator units each include a cylindrical coil which has its axis oriented parallel to the rotary shaft, and has its axis positioned outside the rotor.

The present inventors have proposed stepping motors with a lowered profile in Japanese Patent Applications Nos. 2002-283511, 2002-303904 and 2002-345380 (these applications have not been published yet and therefore do not constitute prior arts).

FIG. 1 attached herein is an exploded perspective view of one of the stepping motors proposed in the aforementioned Japanese Patent Application No. 2002-283511. The stepping motor shown in FIG. 1 comprises: a stator assembly 30 composed of two segments, namely, a first stator unit 30A and a second stator unit 30B which are arranged horizontally on a same plane; and a rotor assembly 50 rotably disposed inside the stator assembly 30.

The first stator unit 30A comprises first upper and lower stator yokes 31a, 34a, a cylindrical spacer 44a1 formed of a magnetic material, and a cylindrical coil unit 40A including a coil 42a for exciting. The first upper and lower stator yokes 31a, 34a have respective pole teeth 32a1 to 32an and 35a1 to 35an.

The second stator unit 30B comprises second upper and lower stator yokes 31b, 34b, a cylindrical spacer 44b1 formed of a magnetic material, and a cylindrical coil unit 40B including a coil 42b for exiting. The second upper and lower stator yokes 31b, 34b have respective pole teeth 32b1 to 32bn and 35b1 to 35bn.

The first and second upper stator yokes 31a, 31b are connected to each other at two center line portions having respective slit cuts 37 adjacently aligned therewith, and the first and second lower stator yokes 34a, 34b are connected to each other at two center line portions having respective slit cuts 38 adjacently aligned therewith.

The first stator unit 30A has its upper and lower pole teeth shifted from each other by 180 degrees in terms of electrical angle, also the second stator unit 30B has its upper and lower pole teeth shifted from each other by 180 degrees in terms of electrical angle, and two pole teeth positioned adjacent to each other via the slit cuts 37 or 38 are shifted from each other by either 90 or 270 degrees in terms of electrical angle.

The rotor assembly 50 comprises a rotary shaft 55, a rotor sleeve 52 fixedly attached onto the rotary shaft 55, and a ring magnet 51 fixedly attached onto the rotor sleeve 52 and having a plurality of magnetic poles circumferentially arranged alternately with N and S poles at a regular interval.

In the stepping motor disclosed in the aforementioned Japanese Patent Application Laid-Open No. H10-94237, since distances from the coil to the pole teeth vary greatly from one pole tooth to another, magnetic flux generated by the coil is not evenly carried through to the pole teeth, which causes variation in magnetic flux density and therefore also in torque generation from one pole tooth to another. Specifically, magnetic flux density at pole teeth positioned closest to the slit cuts 37, 38, in other words, farthest from the coil is the lowest, and therefore torque generated at these pole teeth is smaller than torque generated at other pole teeth that are positioned closer to the coil and consequently have a higher magnetic flux density, thus causing variation in torque.

The stepping motor disclosed in the aforementioned PCT International Application (Japanese Translation) No. 2003-500998 has a structure similar to that of the stepping motor described above, and suffers the aforementioned problem of variation in torque generation from one pole tooth to another. Further, since the two stator units are connected to each other via interconnecting portions having a large area located between respective stator yokes, magnetic fluxes generated by respective coils are allowed to easily interfere with each other, which deteriorates torque generation, especially, at pole teeth positioned near the interconnecting portions, and which results in increasing variation in torque generation.

Also, as for the stepping motors proposed in the aforementioned Japanese Patent Applications Nos. 2002-283511, 2002-303904 and 2002-345380, the structure is substantially similar to that of the stepping motors described above, and therefore the same problem is involved. The problem is demonstrated in FIG. 2 showing a graph of magnetic flux distribution at each pole tooth, achieved when current is caused to flow in the coils 42a, 42b of the stepping motor shown in FIG. 1. As shown in FIG. 2, magnetic flux density varies from one pole tooth to another such that the density is the highest at pole teeth positioned closest to the coils (represented by 0, 180 and 360 degrees), then decreases gradually at pole teeth positioned sequentially farther therefrom, and becomes the lowest at pole teeth positioned farthest therefrom, that is to say, closest to the interconnecting portions between the first and second stator yokes. The variation in magnetic flux density leads to variation in torque generation.

Further, in the aforementioned stepping motors, the spacer, which is formed of a magnetic material, disposed between the upper and lower stator yokes, and which constitutes a part of the magnetic circuit of the stator yokes, is fabricated usually by machining therefore prohibiting cost reduction. To overcome this problem, in the stepping motor proposed in the aforementioned Japanese Patent Application No. 2002-303904, the spacer is structured such that a part of each upper and lower stator yoke is drawn so as to form a protrusion adapted to perform spacing function, whereby the number of components is reduced. However, since the spacer thus drawn of the stator yoke plate has its thickness diminished due to the drawing process, and also since the magnetic characteristic of the stator yoke material is deteriorated due to the stress caused by the drawing process, sufficient magnetic force is not generated.

SUMMARY OF THE INVENTION

The present invention has been made in light of the problems described above, and it is an object of the present invention to provide a stepping motor with a lowered profile, which generates a uniform torque output throughout all the pole teeth for enhanced torque characteristic, and which can be produced inexpensively.

In order to accomplish the object, according to one aspect of the present invention, a stepping motor comprises a rotor assembly, and a stator assembly. The stator assembly includes first and second stator units arranged horizontally on a same plane. Each of the first and second stator units is composed of: upper and lower stator yokes which are shaped substantially semi-annular, arranged parallel to and squarely opposite to each other, each have a plurality of pole teeth formed along its inner circumference so as to surround the rotor assembly in a non-contact manner, and which are coupled to each other such that their respective pole teeth oppose each other so as to intermesh; a coil for exciting, disposed so as to be sandwiched between the upper and lower stator yokes; and a spacer oriented parallel to the axial direction of the rotor assembly, and inserted through the coil. And in the each stator unit, the spacer is shaped substantially in rectangular parallelepiped, and the coil is wound rectangularly. Consequently, torque variation is reduced.

In the one aspect of the present invention, the spacer may be composed of a plurality of plates formed by stamping and laminated on one another. Consequently, the spacer can be produced easily.

In the one aspect of the present invention, the upper and lower stator yokes may be coupled to each other via the spacer by engaging with the upper and lower protrusions of the spacer. Consequently, the upper and lower stator yokes can be positioned and fixed easily.

In the one aspect of the present invention, the spacer may be formed of a same material as the upper and lower stator yokes. Consequently, the number of component materials can be reduced for relaxing control, and the volume of one material can be increased for reducing purchase cost.

In the one aspect of the present invention, the upper and lower stator yokes of the first stator unit may be connected respectively to the upper and lower stator yokes of the second stator unit as one body structure, and wherein interconnecting portions between the first and second stator units may be each provided with a slit cut. Consequently, the number of components can be reduced, and at the same time the first and the second stator units can be readily and precisely positioned relative to each other, while torque characteristic can be improved due to the provision of the silt cuts.

In the one aspect of the present invention, the stepping motor may further include a front plate, which is formed of a non-magnetic material, disposed on both upper stator yokes of the first and second stator units, has arms for fixation onto the stator assembly, and which has lugs for attaching the stepping motor to an outside device. Consequently, the stepping motor can be easily attached to an outside device.

BRIEF DESCRIPTION OF THE DRAWINGS

The invention is explained with reference to the attached drawings, which are presented for the purpose of illustration only and in no way limit the invention.

DETAILED DESCRIPTION OF THE PREFERRED EMBODIMENT

One embodiment of the present invention will hereinafter be described with reference to FIGS. 3 to 5.

Figure 3:
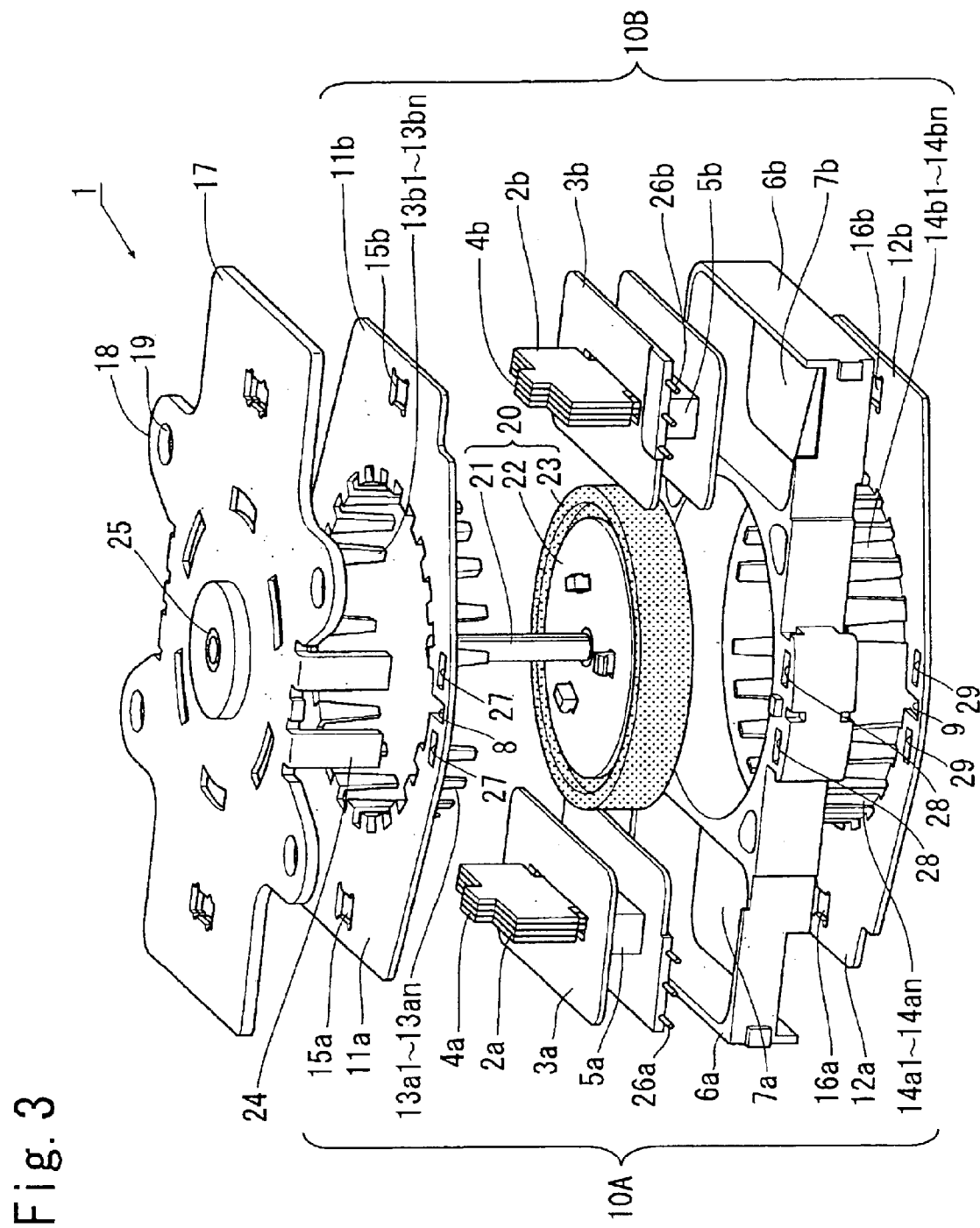
FIG. 3 is an exploded prospective view of a stepping motor according to an embodiment of the present invention.

Referring first to FIG. 3, a stepping motor 1 generally comprises a stator assembly 10 composed of first and second stator units 10A, 10B integrally arranged horizontally on a same plane, and a rotor assembly 20 rotatably disposed inside the stator assembly 10.

The first stator unit 10A includes: first upper and lower stator yokes 11a, 12a; a first spacer 2a formed by laminating plates of a soft-magnetic material and shaped substantially in rectangular parallelepiped; a first coil (not shown) wound on a winding section 5a of a first bobbin 3a shaped rectangular in section; and a first enclosure 6a. The first upper and lower stator yokes 11a, 12a are shaped substantially semi-annular, and have respective pole teeth 13a1 to 13an and 14a1 to 14an formed along their respective inner circumferences and opposing each other so as to intermesh with each other. The first bobbin 3a having the first coil therearound is accommodated in a first open space 7a defined by the first enclosure 6a, the first spacer 2a is inserted through the first bobbin 3a and has its upper and lower protrusions 4a fitted respectively into holes 15a, 16a of the first upper and lower stator yokes 11a, 12a.

The second stator unit 10B includes: second upper and lower stator yokes 11b, 12b; a second spacer 2b formed by laminating plates of a soft-magnetic material and shaped substantially in rectangular parallelepiped; a second coil (not shown) wound on a winding section 5b of a second bobbin 3b shaped rectangular in section; and a second enclosure 6b. The second upper and lower stator yokes 11b, 12b are shaped substantially semi-annular, and have respective pole teeth 13b1 to 13bn and 14b1 to 14bn formed along their respective inner circumference and opposing each other so as to intermesh. The second bobbin 3b having the second coil therearound is accommodated in a second open space 7b defined by the second enclosure 6b, the second spacer 2b is inserted through the second bobbin 3b and has its upper and lower protrusions 4b fitted respectively into holes 15b, 16b of the second upper and lower stator yokes 11b, 12b.

The first and second upper stator yokes 11a, 11b are integrally stamped out of one plate, and slit cuts 8 are formed at interconnecting portions located therebetween. Also, the first and second lower stator yokes 12a, 12b are stamped out of one plate, and slit cuts 9 are formed at interconnecting portions located therebetween.

The first and second enclosures 6a, 6b are integrally formed of a non-magnetic material, for example, synthetic resin which is preferable for cost reduction.

A front plate 17 is disposed on the first and second upper stator yokes 11a, 11b. The front plate 17 is formed of a non-magnetic material, has four lugs 18 provided with respective lug holes 19 for screw-attaching the stepping motor 1 to a device or component, such as a printed circuit board, and which has four arms 24 for fixation onto the stator assembly 10.

The rotor assembly 20 comprises: a rotary shaft 21 formed of non-magnetic stainless steel; a sleeve 22 formed of a non-magnetic material, for example, aluminum alloy, and having the rotary shaft 21 fixedly disposed therethrough; and a ring magnet 23 fixedly attached inside the sleeve 22 and having a plurality of magnetic poles N and S alternately arranged at a regular interval in a circumferential direction. The ring magnet 23 is formed of, for example, ferrite, neodymium, or the like. The rotor assembly is housed inside the stator assembly such that the rotary shaft 21 is rotatably supported by a pair of oil-impregnated metal bearings 25. One of the bearings 25 is attached to the front plate 17, and the other (not shown) is attached to a rear plate (not shown) which is formed of synthetic resin and produced by injection-molding simultaneously when synthetic resin is filled into the stator assembly for solidifying the pole teeth of the stator yokes.

In the embodiment, the upper and lower stator yokes are stamped out of a silicon steel plate which is soft-magnetic, and the first and second spacers 2a, 2b are stamped out of a plate of a same material as the stator yokes. The upper and lower protrusions 4a, 4a of the first spacer 2a are fitted respectively into the holes 15a, 16a of the first upper and lower stator yokes 11a, 12a, the upper and lower protrusions 4b, 4b of the second spacer 2b are fitted respectively into the holes 15b, 16b of the second upper and lower stator yokes 11b, 12b, and the first and second spacers 2a, 2b are fixed respectively to the first and second stator yokes 11a, 12a and 11b, 12b by crimping. In this connection, the non-magnetic material plate for the stator yokes and the spacers may alternatively be of, for example, galvanized steel, electro-magnetic soft iron, and the like.

The first and second bobbins 3a, 3b are shaped rectangular in section to thereby form rectangular coils when wires are wound thereon, and terminals 26a, 26b are attached to the first and second bobbins 3a, 3b, respectively.

The front plate 17 is stamped out of a plate of a non-magnetic material, for example, aluminum alloy, and is fixed onto the stator assembly 10 such that the four arms 24 are inserted through respective holes 27 formed at the upper stator yokes, respective holes 28 formed at interconnecting portions located between the first and second enclosures 6a, 6b, and respective holes 29 formed at the lower stator yokes. The front plate 17 may alternatively be formed of any other non-magnetic materials than aluminum alloy.

Figure 4:
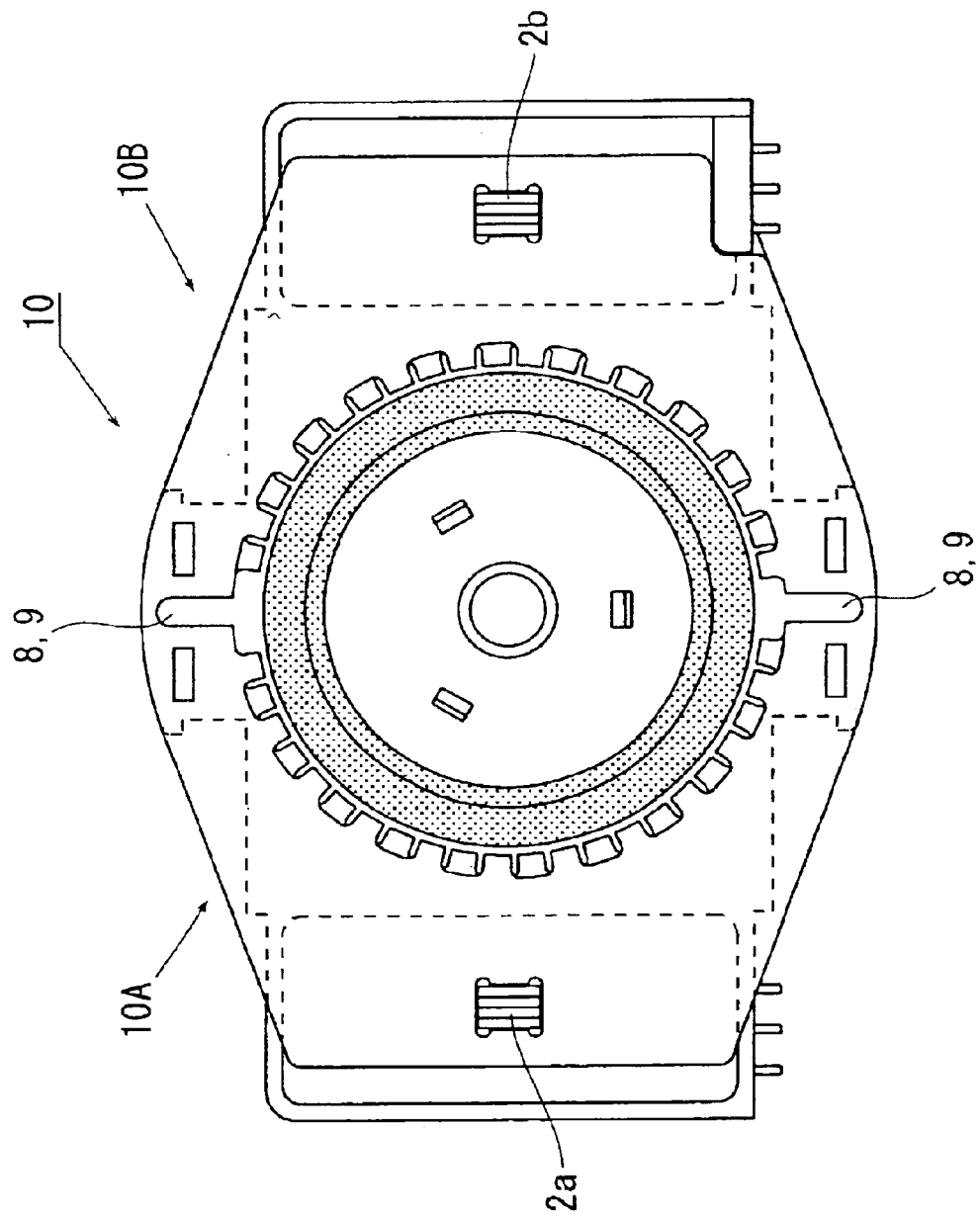
FIG. 4 is a top plan view of the stepping motor shown in FIG. 3, omitting its front plate.

The stator assembly 10 shown in FIG. 4 has its pole teeth arranged to match the rotor assembly 20 with the ring magnet 23 having forty eight magnetic poles. The stator yokes 11a, 12a, 11b and 12b have respective pole teeth formed in the same number. In the first stator unit 10A, the pole teeth 13a1 to 13an of the first upper stator yoke 11a are arranged at a regular interval, and are shifted by 180 degrees in terms of electrical angle from the pole teeth 14a1 to 14an of the first lower stator yoke 12a, which are arranged at a regular interval. In the second stator unit 10B, the pole teeth 13b1 to 13bn of the second upper stator yoke 11b are arranged at a regular interval, and are shifted by 180 degrees in terms of electrical angle from the pole teeth 14b1 to 14bn of the second lower stator yoke 12b, which are arranged at a regular interval. And two pole teeth adjacent to each other via the slit cuts 8, 9 are shifted from each other by either 90 or 270 degrees in terms of electrical angle. Pole teeth are not formed in immediate proximity to the slit cuts 8, 9.

Figure 1:
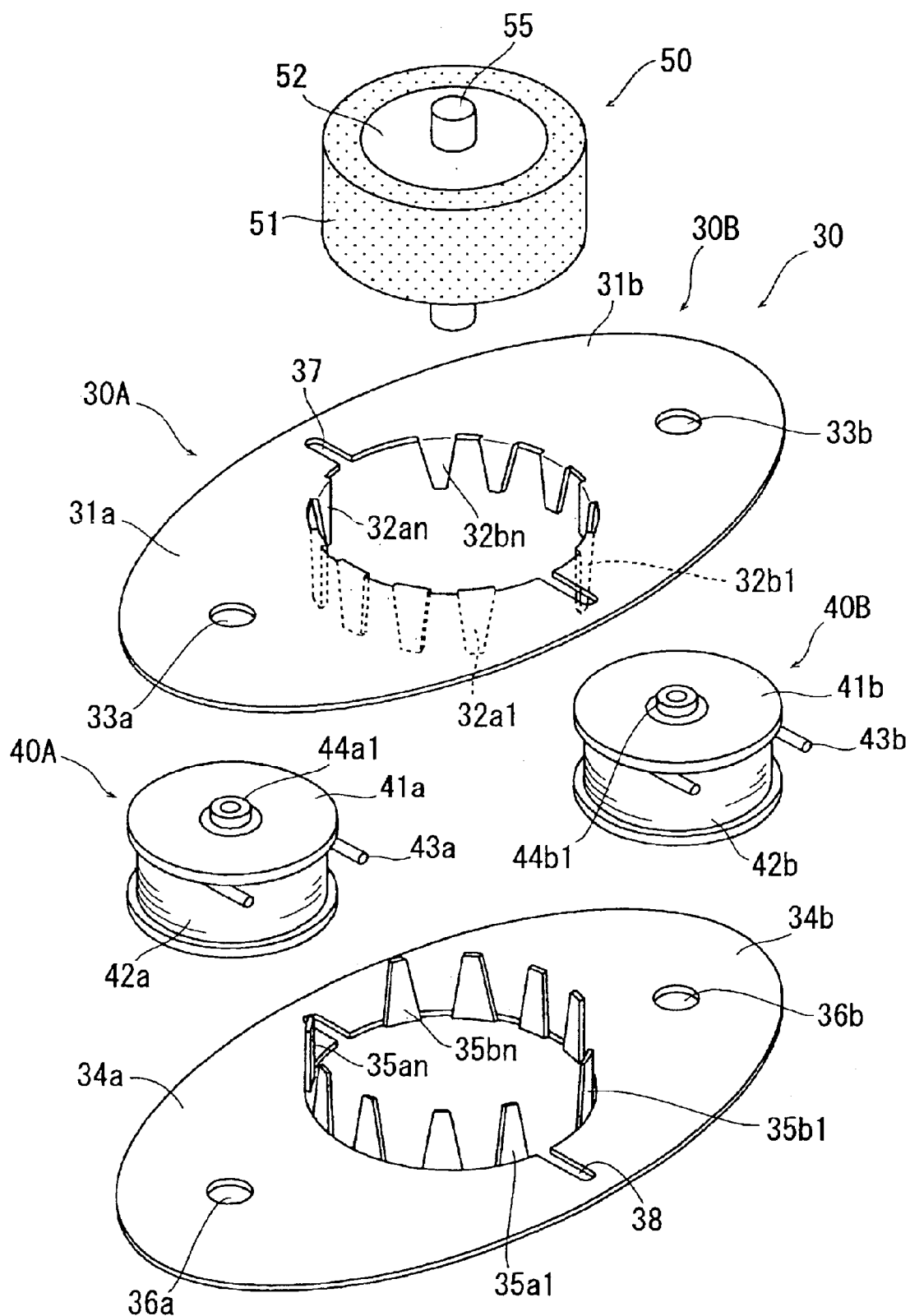
FIG. 1 is an exploded perspective view of a conventional stepping motor.
Figure 2:
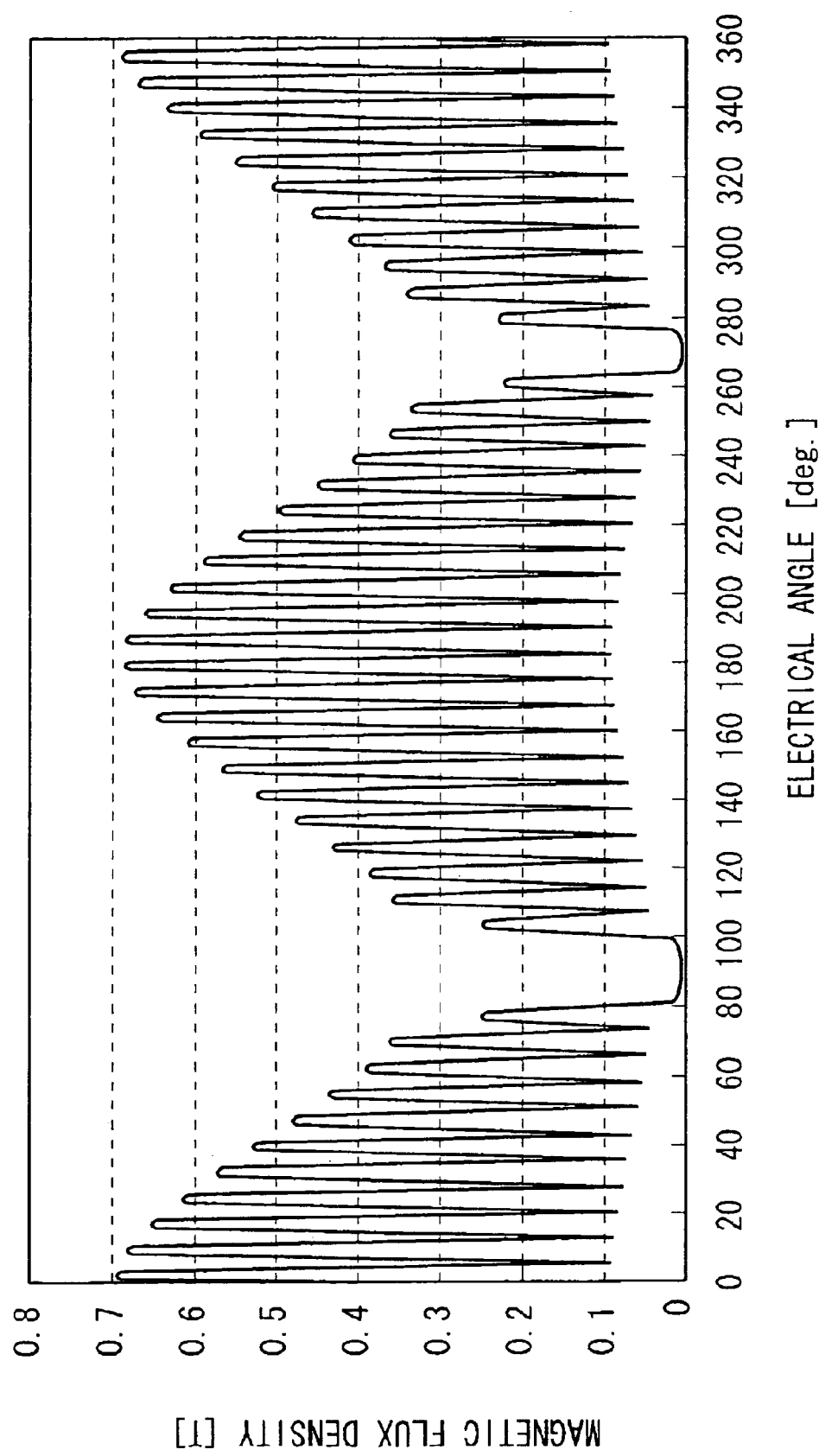
FIG. 2 is a graph of magnetic flux density distribution over pole teeth, achieved when current is caused to flow in coils of the stepping motor shown in FIG. 1.
Figure 5:
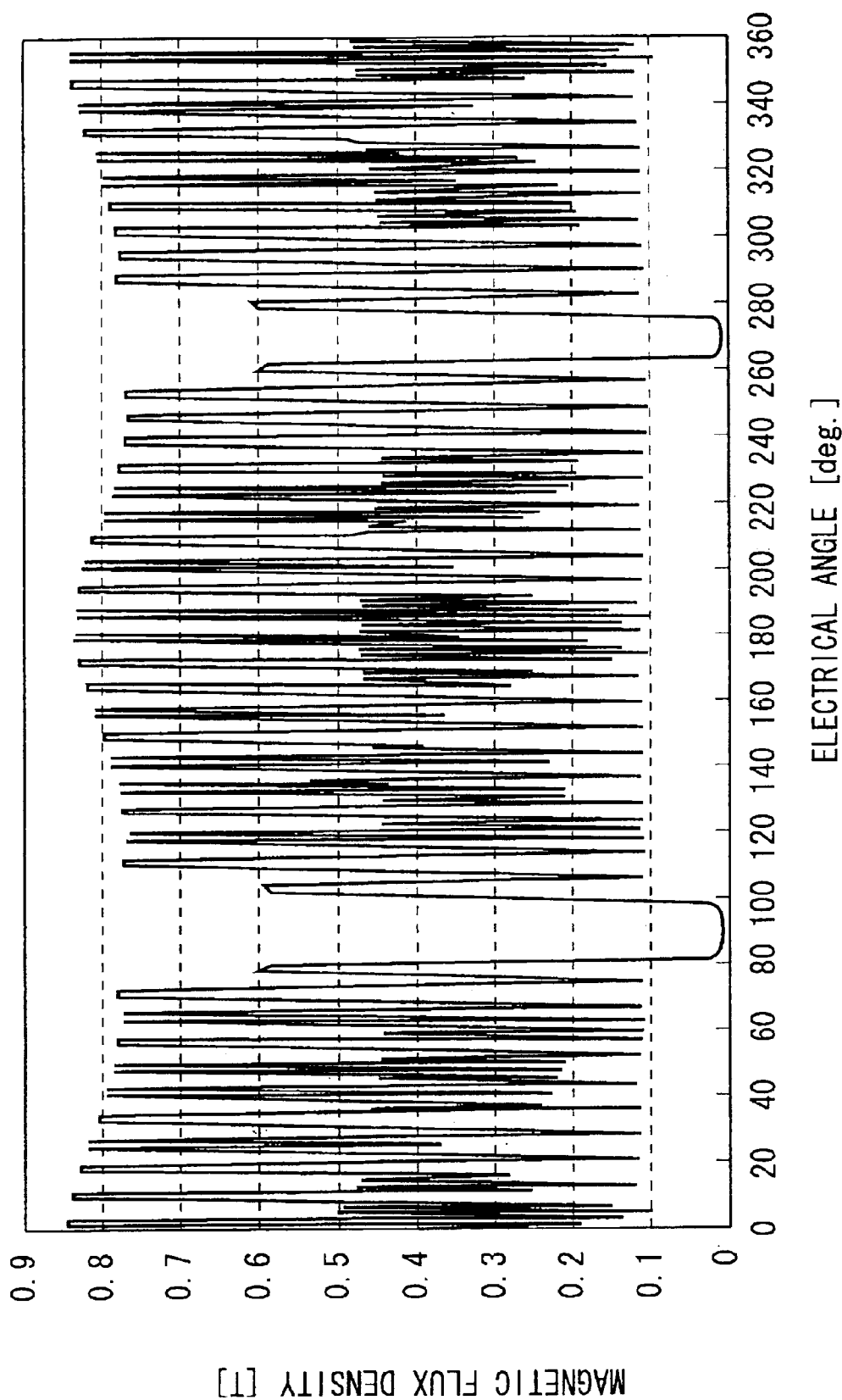
FIG. 5 is a graph of magnetic flux density distribution over pole teeth, achieved when current is caused to flow in coils of the stepping motor shown in FIG. 3.

FIG. 5 shows magnetic flux density distribution over the entire pole teeth in the stepping motor according to the present invention, achieved when the first and second coils (not shown) wound respectively on the winding sections 5a, 5b of the first and second bobbins 3a, 3b are excited. As shown in FIG. 5, magnetic flux densities at the pole teeth are approximate to one another, indicating that variation is significantly reduced compared to the variation (refer to FIG. 2) in the conventional stepping motor having its coils wound circularly (refer to FIG. 1), which means that the difference is diminished between the highest and lowest magnetic flux densities achieved respectively at the pole teeth positioned closest to and farthest from the coils. Consequently, the stepping motor of the present invention, which has its coils rectangularly wound, has torque variation reduced compared to the conventional stepping motor which has its coils circularly wound.

The slit cuts 8, 9 are provided to prevent magnetic interference between the first and second stator units 10A and 10B. The slit cuts 8, 9 with a larger dimension perform better prevention, but too largely dimensioned slit cuts lessen the strength at the interconnecting portions thereby generating an increased chance for deformation. The present inventors have studied the dimension of the slit cuts 8, 9, and found out that a slit cut having its dimension set at least two thirds of the width of the interconnecting portion is effective in increasing magnetic resistance so as to cause magnetic saturation, whereby influence on torque characteristic from the magnetic interference between the first and second stator units 10A and 10B is held down to 5% or less, which does not represent a critical problem.

The first upper and lower stator yokes 11a, 12a are integrally connected respectively to the second upper and lower stator yokes 11b, 12b via the interconnecting portions as one body structure, whereby the number of components is reduced, and also the first and second stator units 10A, 10B can be appropriately positioned relative to each other consistently. In this connection, if the interconnecting portions are removed to separate the first and second stator yokes, then influence from the magnetic interference between the first and second stator units 10A and 10B can be eliminated.

It is evident that those skilled in the art may now make numerous modifications and variations in light of the above teaching without departing from the inventive concepts. Consequently, it is to be understood that the detailed description of the present invention should be taken as illustrative and not limiting, wherein the scope of the present invention should be determined by the claims that follow.

What is claimed is:

1. A stepping motor comprising
   a rotor assembly, and
   a stator assembly including first and second stator units which are arranged horizontally on a same plane, and each of which is composed of: upper and lower stator yokes which are shaped substantially semi-annular, arranged parallel to and squarely opposite to each other, each have a plurality of pole teeth formed along its inner circumference so as to surround the rotor assembly in a non-contact manner, and which are coupled to each other such that their respective pole teeth oppose each other so as to intermesh; a coil for exciting, wound rectangularly, and disposed so as to be sandwiched between the upper and lower stator yokes; and a spacer shaped substantially in rectangular parallelepiped, oriented parallel to an axial direction of the rotor assembly, and inserted through the coil.

2. A stepping motor according to claim 1, wherein the pacer is composed of a plurality of plates formed by stamping and laminated on one another.

3. A stepping motor according to claim 1, wherein the upper and lower stator yokes are coupled to each other via the spacer by engaging with upper and lower protrusions of the spacer.

4. A stepping motor according to claim 1, wherein the spacer is formed of a same material as the upper and lower stator yokes.

5. A stepping motor according to claim 1, wherein the upper and lower stator yokes of the first stator unit are connected respectively to the upper and lower stator yokes of the second stator unit as one body structure, and wherein interconnecting portions between the first and second stator units are each provided with a slit cut.

6. A stepping motor according to claim 1, further comprising a front plate, which is formed of a non-magnetic material, disposed on both upper stator yokes of the first and second stator units, has arms for fixation onto the stator assembly, and which has lugs for attaching the stepping motor to an outside device.

* * * * *